US012549542B2

(12) United States Patent
Rathinasamy et al.

(10) Patent No.: US 12,549,542 B2
(45) Date of Patent: Feb. 10, 2026

(54) VISIBLE LIGHT COMMUNICATION (VLC) BASED MULTI-FACTOR AUTHENTICATION (MFA) MECHANISM FOR EDGE DEVICES

(71) Applicant: Dell Products L.P., Round Rock, TX (US)

(72) Inventors: Shree Rathinasamy, Georgetown, TX (US); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 18/645,226

(22) Filed: Apr. 24, 2024

(65) Prior Publication Data
US 2025/0337735 A1 Oct. 30, 2025

(51) Int. Cl.
*H04L 9/40* (2022.01)
(52) U.S. Cl.
CPC ...... *H04L 63/0838* (2013.01); *H04L 63/0853* (2013.01)
(58) Field of Classification Search
CPC .... H04L 63/0838; H04L 63/0853; H04L 9/40
See application file for complete search history.

(56) References Cited

U.S. PATENT DOCUMENTS

2015/0302732 A1\* 10/2015 Wright ............ H04N 21/42204
340/5.25

FOREIGN PATENT DOCUMENTS

| CA | 2837235 A1 \* | 12/2012 | ........... H04L 9/3215 |
| CA | 3206099 A1 \* | 8/2022 | ......... F41H 13/0025 |
| CN | 111478998 A \* | 7/2020 | ............... G06T 7/11 |

\* cited by examiner

*Primary Examiner* — Jayesh M Jhaveri
(74) *Attorney, Agent, or Firm* — Workman Nydegger (57) ABSTRACT

One example method includes accessing, at a user device, a One Time Password (OTP) that includes randomly generated content that is used during a Multi-Factor Authentication (MFA) process between the user device and an edge device. At the user device, the randomly generated content of the OTP is mapped onto light that is generated by a built in flash of the user device to generate a modulated light signal. The modulated signal is transmitted from the user device to the edge device using Light Fidelity (Li-Fi) protocol. The edge device is accessed upon a successful completion of the MFA process.

19 Claims, 8 Drawing Sheets

VISIBLE LIGHT COMMUNICATION (VLC) BASED MULTI-FACTOR AUTHENTICATION (MFA) MECHANISM FOR EDGE DEVICES

TECHNOLOGICAL FIELD OF THE DISCLOSURE

Embodiments disclosed herein generally relate to user devices and edge devices. More particularly, at least some embodiments relate to systems, hardware, software, computer-readable media, and methods for using light transmitted by a built in flash of the user devices during a Multi-Factor Authentication (MTA) process between user devices and edge devices.

BACKGROUND

Security is a critical aspect of Telco and edge device security. The location of an edge device and the absence of physical security limitations and procedures can make it susceptible to security threats such as theft, vandalism, unauthorized access, etc. Security is particularly important in Edge environments since they operate in remote and public locations. There is also data that is typically sensitive such as personal information, financial transactions, confidential business information, etc. As a result, edge devices are major targets for theft or tampering of the devices.

While data centers implement best practices and conduct regular security audits, it is very difficult in edge locations to mitigate these risks and ensure the availability and security of their services. Edge computing devices and gateways are more vulnerable to attacks.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Embodiments disclosed herein generally relate to user devices and edge devices. More particularly, at least some embodiments relate to systems, hardware, software, computer-readable media, and methods for using light transmitted by a built in flash of the user devices during a Multi-Factor Authentication (MTA) process between user devices and edge devices.

One example method includes accessing, at a user device, a One Time Password (OTP) that includes randomly generated content that is used during a Multi-Factor Authentication (MFA) process between the user device and an edge device. At the user device, the randomly generated content of the OTP is mapped onto light that is generated by a built in flash of the user device to generate a modulated light signal. The modulated signal is transmitted from the user device to the edge device using Light Fidelity (Li-Fi) protocol. The edge device is accessed upon a successful completion of the MFA process.

Another example embodiment includes receiving, at an edge device, a modulated light signal transmitted by a user device. The modulated light signal is received using Light Fidelity (Li-Fi) protocol. The modulated light signal includes a One Time Password (OTP) including randomly generated content that is used during a Multi-Factor Authentication (MFA) process between the user device and an edge device. The received modulated light signal is decoded to extract the OTP from the modulated light signal. The extracted OTP is validated to determine that it matches an expected OTP that is present at the edge device. Access is granted to the edge device upon a successful completion of the MFA process.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

Figure 1A:
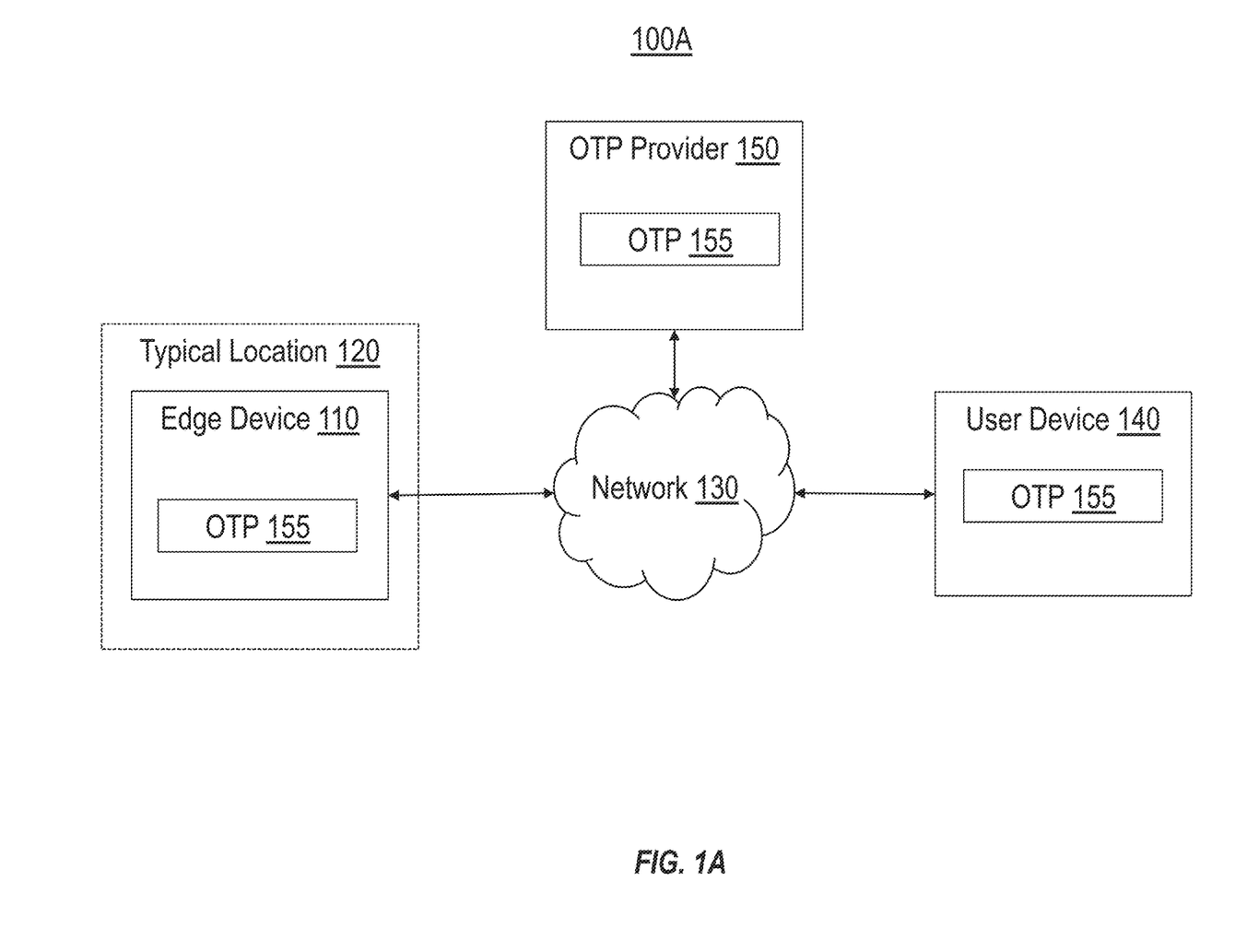
FIGS. 1A-1C disclose aspects of an environment for implementing the embodiments disclosed herein.

FIG. 1A illustrates an environment 100A in which the embodiments disclosed herein may be employed. The environment 100A includes an edge device (also known as an "edge node") that is located at a typical location 120. The edge device 110 is any device having computing capabilities that is located at the edge of a network of computing devices. Thus, the term "edge device" is broadly used herein.

When the edge device 110 is located in a typical location 120, the edge device 110 has access to a wide area network 130 such as the Internet. As used herein, a "typical location" is one where the edge device 110 has access to the network 130. The edge device 110 may be connected to the network 130 wirelessly using Wi-Fi, Bluetooth, or some other suitable wireless protocol.

In order to validate that the user device 140 should be given access to the edge device 110, a One Time Password (OTP) provider 150 is utilized, typically during a Multi-Factor Authentication (MFA) process. The OTP provider 150 may be any reasonable OTP provider such as Google Authenticator or Microsoft. In some embodiments, the edge device 110 and the user device 140 may implement their own private OTP provider 150.

When the user device 140 attempts to log into the edge device 110, the user device 140 will typically initially provide a first login credential such as a username and password or a biometric credential. This process is not illustrated in FIG. 1A. At this point, the OTP provider 150 will generate an OTP 155 in a random and cryptographically secure way. The OTP provider 150 will provide the OTP 155, which may be implemented as randomly generated content including, but not limited to, a numeric code, a QR code, or a series of digits, to the user device 140 via the network 130. The user device 140 provides the OTP 155 to edge device 110.

The OTP provider 150 will also provide mechanisms for the edge device 110 to verify the OTP 155 and this is represented by OTP 155 being included in the edge device 110. Upon verification of the OTP 155, the user device is given access to the edge device 110. Thus, this process provides for an MFA session that provides enhanced security when the user device 140 attempts to log into the edge device 110.

Figure 1B:
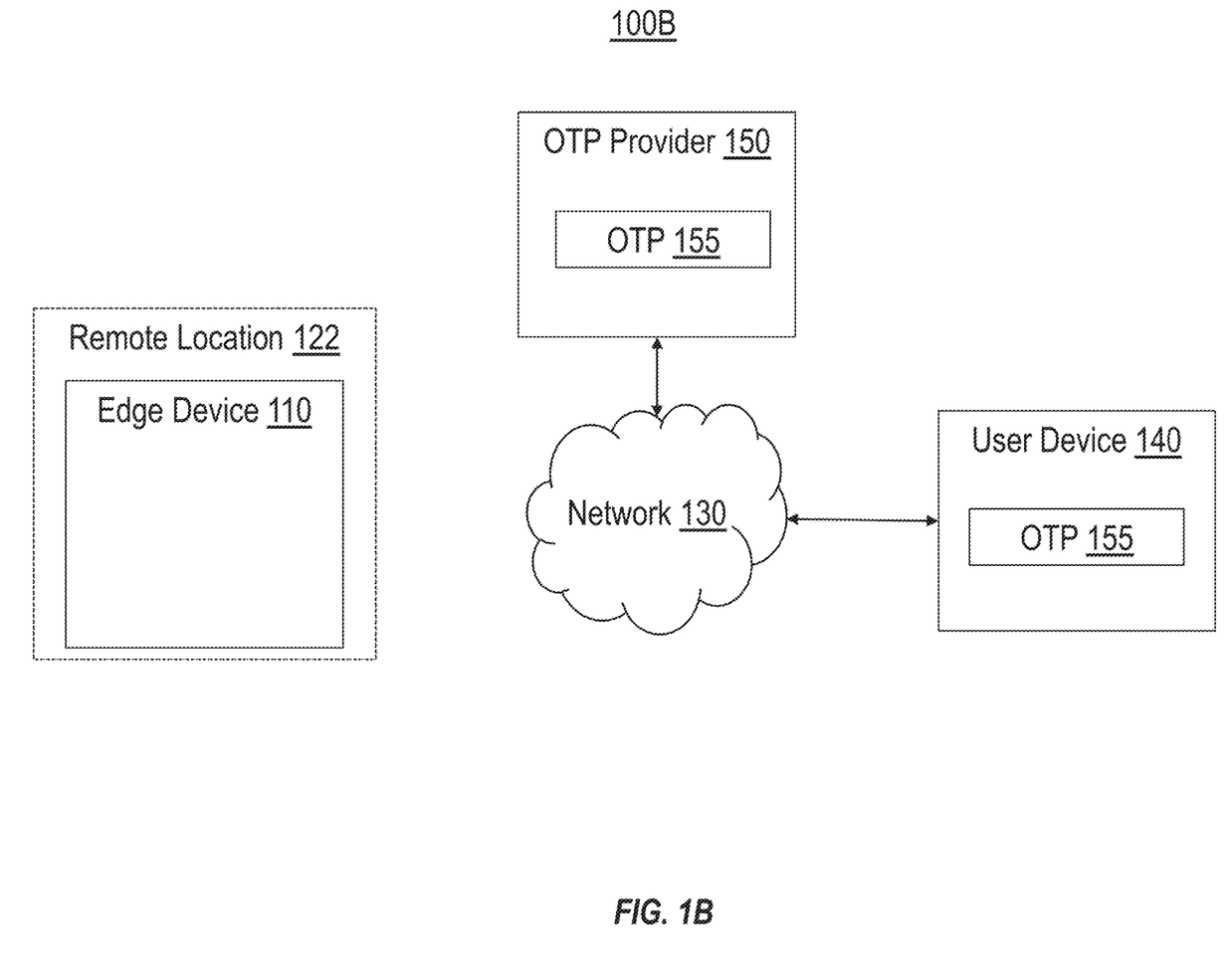

FIG. 1B illustrates an environment 100B in which the embodiments disclosed herein may be employed. As with the environment 100A, the environment 100B includes the edge device 110, the user device 140, and the OTP provider 150. However, in the environment 100B, the edge device 110 is located at a remote location 122. As used herein, a "remote location" is a location where the edge device has no access to or at best very limited and intermittent access to the network 130. This is represented in FIG. 1B by the lack of an arrow between edge device 110 and network 130. For example, a remote location 122 could be a ship that is sailing across the ocean, or it could be in a country with limited internet access. Accordingly, because the because the edge device 110 does not have access to the network 130, it is not able to participate in an MFA session with the OTP provider and the user device 140. Thus, the edge device is unable to authenticate the user device 140, which could lead to security issues if the user device 140 is able to log into the edge device 110.

Figure 1C:
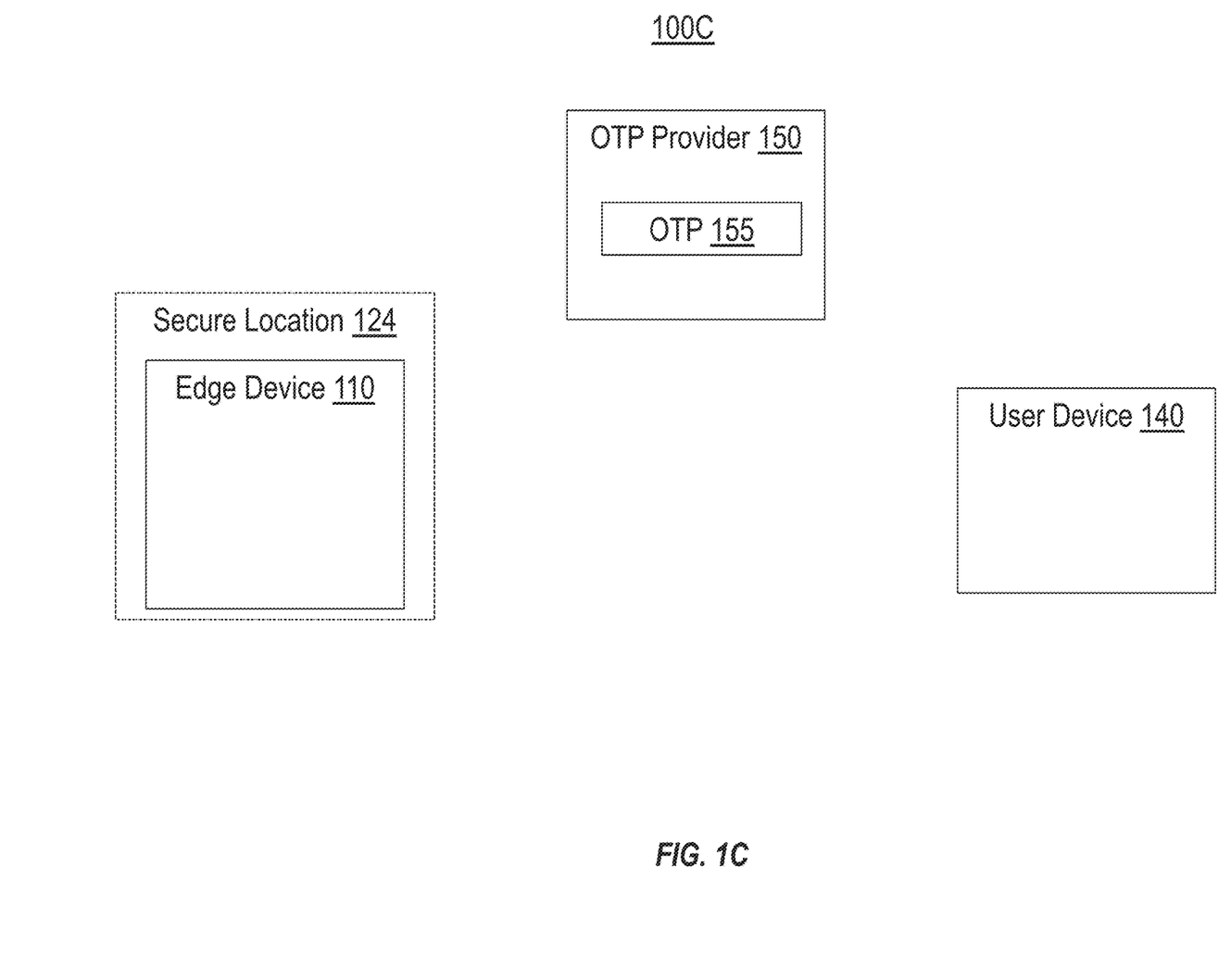

FIG. 1C illustrates an environment 100C in which the embodiments disclosed herein may be employed. As with the environment 100A, the environment 100C includes the edge device 110, the user device 140, and the OTP provider 150. However, in the environment 100C, the edge device 110 is located at a secure location 124. As used herein, a "secure location" is a location where the edge device 110 has no access to the network 130 so as to remain secure from any attempts for a malicious party to use the network 130 to maliciously access the edge device 110. This is represented in FIG. 1C by the lack of a network 130. For example, a secure location 124 could be a financial institution or secure data storage facility where sensitive data is stored. As with environment 100B, because the because the edge device 110 does not have access to the network 130, it is not able to participate in an MFA session with the OTP provider 150 and the user device 140. Thus, the edge device is unable to authenticate the user device 140, which could lead to security issues if the user device 140 is able to log into the edge device 110.

Accordingly, due to the edge device 110 being located in the either remote location 122 or the secure location 124, the edge device are not able to able to participate in an MFA session with the OTP provider 150 and the user device 140. In addition, even though the edge device 110 is able to participate in an MFA session with the OTP provider 150 and the user device 140 when located at the typical location 120, there may instances where the traditional MFA process may not provide the desired level of security as a malicious party may maliciously use the MFA process to gain unauthorized access to edge device 110.

Advantageously, the embodiments disclosed herein provide for a robust and scalable MFA solution that can effectively authenticate user devices attempting to access the edge device 110 even when the edge device is located at the remote location 122 or the secure location 124. In particular, the embodiments disclosed herein use Light Fidelity (LiFi or Li-Fi) protocol with coordination of a user device 140, typically a handheld user device such as a cell phone or a tablet, which has a built in flash, to perform the MFA process as will be explained in more detail to follow. The embodiments disclosed herein thus are able to provide the MFA process even in the absence of the network 130. In addition, because the embodiments disclosed herein require the user device 140 having the built in flash to be in close proximity of the edge device 110, the embodiments disclosed herein provide enhanced security to the MFA process even for edge devices located in the typical location 120 as will be explained in more detail to follow.

LiFi is a type of wireless communication technology that relies on light to transmit data between different devices. A LiFi communication session is established when one device uses its LiFi transmitter to send light transmissions to a LiFi receiver of a different device. Because LiFi relies on the transmission of light, one will appreciate how it is typically the case that the LiFi transmitter and receiver remain within the line-of-sign of each other.

Communications made via a LiFi communication session can be transmitted at a high speed, higher even than traditional wireless fidelity (WiFi) transmissions. Also, these transmissions can occur using different spectrums of light, such as the visible light spectrum, the infrared light spectrum, or even the ultraviolet light spectrum. Whereas traditional WiFi communications occur via the use of modulated radio frequencies to induce an antenna's electrical tension, LiFi uses the modulation of light to transmit data using different light patterns or intensities. As a result, LiFi can beneficially be used in conditions that may not be conducive to radio frequency transmissions, such as areas where radio interference may be present.

Figure 2:
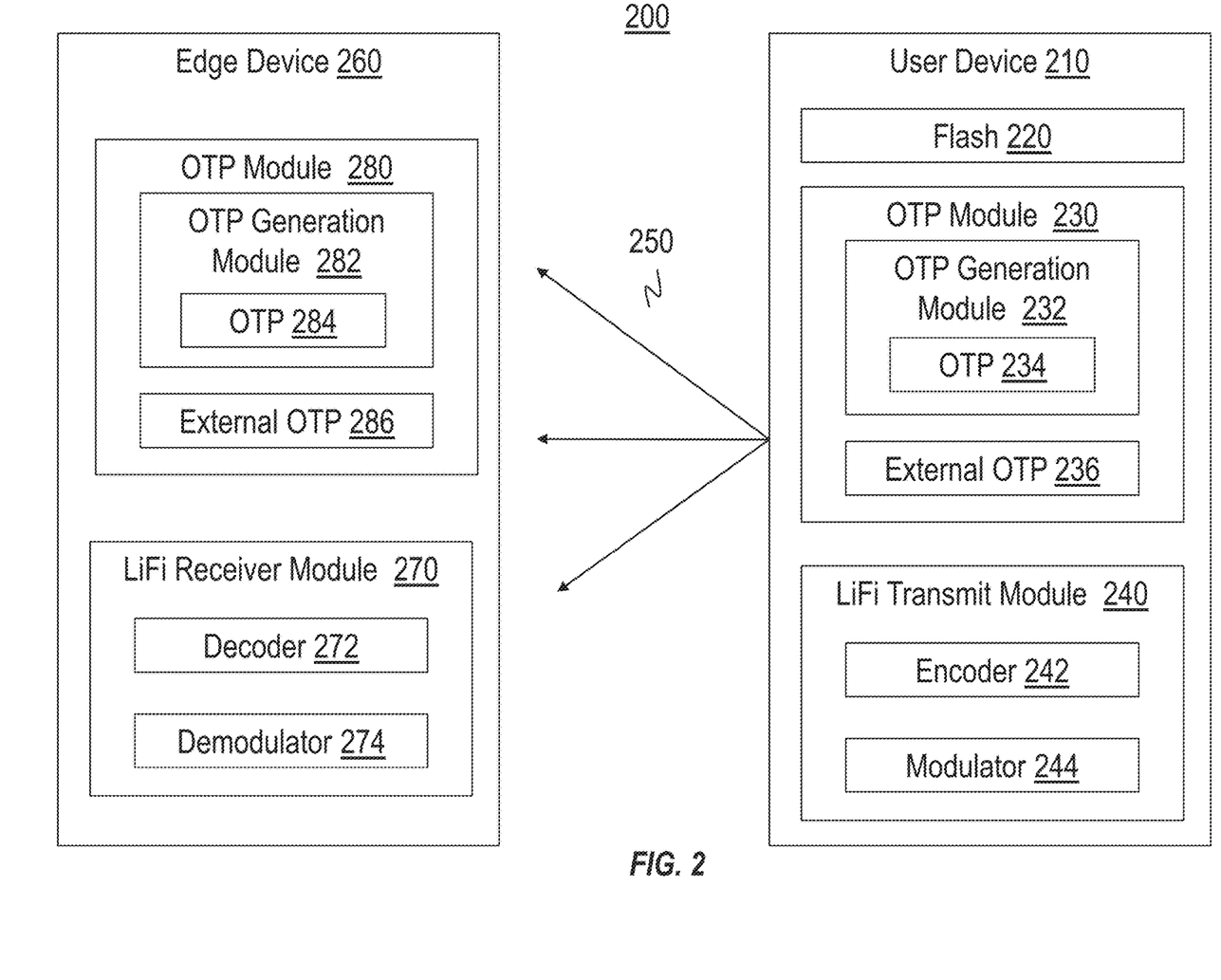
FIG. 2 discloses aspects of a user device and an edge device according to the embodiments disclosed herein.

FIG. 2 illustrates an environment 200 showing embodiments of a user device and an edge device and their interactions accordingly to the embodiments disclosed herein. As illustrated, the environment 200 includes a user device 210, which may correspond to user device 140. The user device 210 may be any device having a built in flash 220 that can be used to modulate light as will be explained in more detail to follow. Thus, the user device 210 will typically be a cell phone or a tablet device. However, the embodiments disclosed herein are not limited to any specific type of user device as long as the user device has a the built in flash 220.

The user device 210 also includes an OTP module 230. The OTP module 230 includes an OTP generation module 232. In operation, the OTP generation module 232 executes one or more algorithms that follow cryptographic standards to generate random and unique OTPs. For example, the OTP generation module 232 generates an OTP 234.

In some embodiments, in addition to the OTP generation module 232 or alternative to the OTP generation module 232, the OTP module 230 be able to access an external OTP provider such as the OTP provider 150. In such embodiments, the OTP module 230 may receive an external OTP 236 from the OTP provider in the manner previously described.

The user device 210 further includes a LiFi transmit module 240 that in operation uses the flash 220 as a light source for modulating the OTP 234 or 236. Accordingly, the LiFi transmit module 240 includes an encoder 242, which may be any reasonable encoder, that in operation encodes the OTP 234 or the OTP 236 into a format that can be transmitted via the light emitted by the flash 220.

A modulator 244, which may be any reasonable modulator, then maps the encoded OTP into distinct light patterns or intensities, resulting in a modulated light signal 250. The modulated light signal 250 is then transmitted to an edge device 260.

Figure 3:
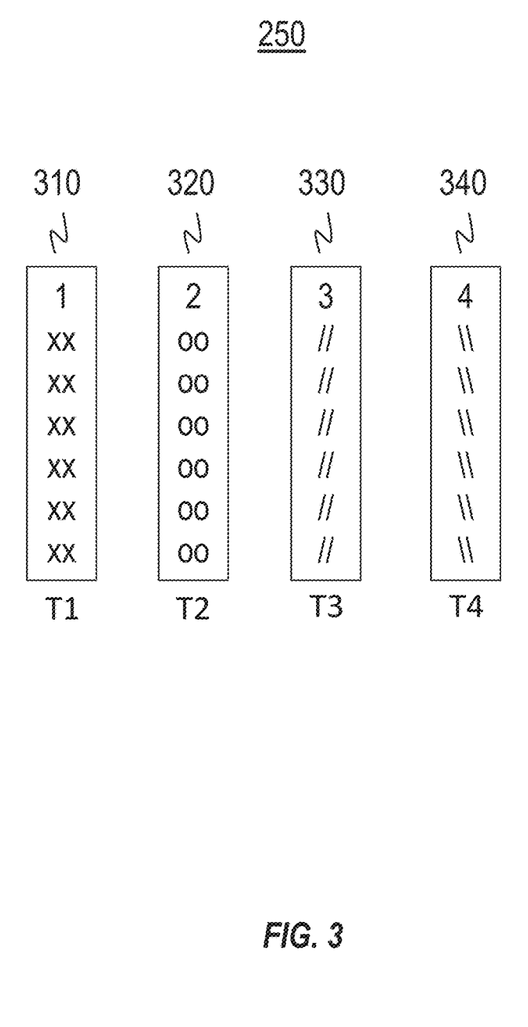
FIG. 3 discloses aspects of modulated light signal according to the embodiments disclosed herein.

FIG. 3 illustrates an embodiment of the modulated light signal 250. In the embodiment of FIG. 2, the modulated light signal 250 encodes a numeric code having the digits "1,2, 3,4". As shown at 310, during a first time period T1, the modulator 244 maps the first digit "1" to a first light pattern represented by "xx". As shown at 320, during a second time period T2, the modulator 244 maps the second digit "2" to a second light pattern represented by "00". As shown at 330, during a third time period T3, the modulator 244 maps the third digit "3" to a third light pattern represented by "//". As shown at 340, during a fourth time period T4, the modulator 244 maps the fourth digit "4" to a fourth light pattern represented by "\\". Although FIG. 3 is a simple representation, the figure shows that by changing the pattern or intensity of the flash 220 during different time periods, the OTP 234 or 236 can be encoded and transmitted in a way that can be recovered at the edge device 260.

As illustrated, the modulated light signal 250 is received at an edge device 260, which may correspond to the edge device 110. As shown, the edge device 260 includes a LiFi receiver module 270 that in operation receives the modulated light signal 250. Specifically, the LiFi receiver module 270 includes a demodulator 274, which may be any reasonable demodulator that is configured to demodulate the light patterns and intensities of the modulated light signal 250. The demodulated signal is then provided to a decoder 272, which may be any reasonable decoder that is configured to work with the encoder 242. The encoder extracts the encoded OTP 234 of the encoded external OTP 236.

The edge device 260 includes an OTP module 280. The OTP module 280 includes an OTP generation module 282. In operation, the OTP generation module 282 executes one or more algorithms that correspond to the algorithms executed by the OTP generation module 232.

The OTP generation module 282 receives the OTP 284 that was extracted from the modulated light signal 250. Since the OTP generation module 282 includes the same algorithms used by the OTP generation module 232, the OTP generation module 282 is able to generate an expected OTP 284 that corresponds to the OTP 234. The OTP 234 that was extracted from the modulated light signal 250 is then validated against the expected OTP 284. If the expected OTP 284 matches the OTP 234 that was extracted from the modulated light signal 250, then MFA has been successfully performed and the user device 210 can be given access to the edge device 260.

In the embodiments where the external OTP 236 is encoded and transmitted as the modulated light signal 250, the OTP module 280 should receive from the OTP provider 150 an external OTP 286 that corresponds to the external OTP 236. The external OTP 236 that was extracted from the modulated light signal 250 is then validated against the expected external OTP 286. If the expected external OTP 286 matches the external OTP 236 that was extracted from the modulated light signal 250, then MFA has been successfully performed and the user device 210 can be given access to the edge device 260.

Returning to FIG. 1B, the embodiments disclosed herein provide a way to preform MFA even when the edge device 110 is located in the remote location 122 and is not able to access the network 130 to perform the MFA process in conjunction with the OTP provider 150. For example, by integrating a LiFi receiver module (e.g., LiFi receiver module 270) into the edge device 110, the edge device 110 is able to receive light signals according to the LiFi protocol. In addition, by implementing a LiFi transmits module (e.g., LiFi transmit module 240) into the user device 140 that utilizes the device's built in flash (e.g., flash 220), the user device 140 is able to transmit light signal according to the LiFi protocol.

Accordingly, the user device is able to encode and modulate an OTP that is generated at the user device 140 and the transmit the OTP to the edge device 110 using the built in flash as explained in relation to FIG. 2. The edge device 110 is then able to demodulate and decode the OTP transmitted from the user device 140. The edge device 110 is able to validate that the received OTP matches an expected OTP, and if a match is found then the MFA process has been successfully performed. Thus, the secure authentication that is provided by MFA can be performed regardless of whether the edge device 110 access to the network 130.

Returning to FIG. 1B, the embodiments disclosed herein provide a way to preform MFA even in the edge device 110 is in the secure location 124 through the use of the LiFi. As mentioned previously, LiFi typically requires line-of-sight between the edge device 110 and the user device 140. In the case of the embodiments disclosed herein, since the range of the flash 220 is fairly limited, the line-of-sight requirement requires that the user device 140 be placed in relatively close proximity to the edge device 110 when performing the MFA process. In this case, a user of the user device 140 is able to enter the secure location 122 and bring the user device 140 into close proximity with the edge device 110. The MFA process can then be performed in the manner previously described, thus providing the security enhancements MFA allows.

In addition, as it is unlikely that a malicious person would be allowed into the secure location 122, the requirement for close proximity provides an additional security feature as only trusted users would be allowed to gain the close proximity needed to even attempt the MFA process. Thus, most, if not all, malicious persons would not even be given the chance to use the MFA process to attempt to gain unauthorized access to the edge device 110.

Similarly, the close proximity requirement provides additional security even when the edge device is located in the typical location 120. That is, in such cases even though the edge device 110 is able to access the network 130 to perform the MFA process in conjunction with the OTP provider 150, there is still a risk that malicious persons would try to use the MFA process to attempt to gain unauthorized access to the edge device 110. Accordingly, requiring the MFA process to be performed using LiFi in the manner described herein and thus requiring the close proximity of the user device 140 and the edge device 110, makes it easier to control who is able to attempt the MFA process in the first place.

In addition, as mentioned previously, LiFi communication session can be transmitted at a high speed, higher even than traditional WiFi transmissions. Accordingly, the embodiments disclosed herein using the LiFi MFA process provide near-instantaneous authentication due to the speed of the light transmission. This results in quicker access for the user device 140 to the resources of the edge device 110 when compared to traditional MFA processes.

Example Methods

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 4:
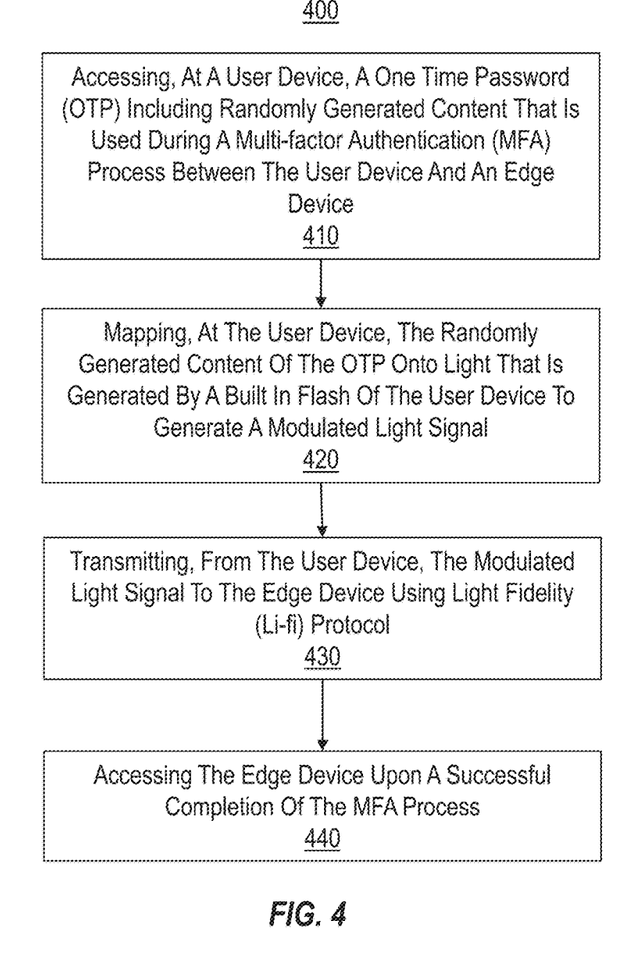
FIG. 4 discloses a method according to the embodiments disclosed herein.

Directing attention now to FIG. 4, an example method 400 is disclosed. The method 400 will be described in relation to one or more of the figures previously described, although the method 400 is not limited to any particular embodiment.

The method 400 includes accessing, at a user device, a One Time Password (OTP) including randomly generated content that is used during a Multi-Factor Authentication (MFA) process between the user device and an edge device (410). For example, as previously described the user device 210 generates the OTP 234 of receives the OTP 236 from the external OTP provider 150.

The method 400 includes mapping, at the user device, the randomly generated content of the OTP onto light that is generated by a built in flash of the user device to generate a modulated light signal (420). For example, as previously described LiFi transmit module 240 maps the content of the OTP 234 or external OTP 236 onto the light generated by the flash 220 to generate the modulated light signal 250.

The method 400 includes transmitting, from the user device, the modulated light signal to the edge device using Light Fidelity (Li-Fi) protocol (430). For example, as previously described the modulated light signal 250 is transmitted to the edge device 260.

The method 400 includes accessing the edge device upon a successful completion of the MFA process (440). For example, as previously described the edge device grants access to the user device 210 upon successful completion of the MFA process.

Figure 5:
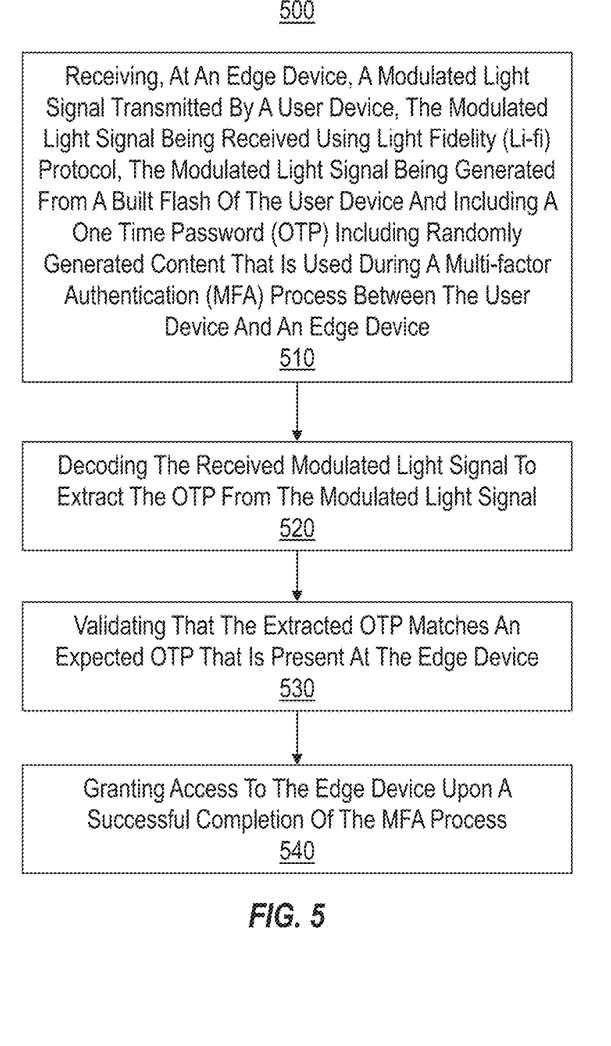
FIG. 5 discloses a method according to the embodiments disclosed herein.

Directing attention now to FIG. 5, an example method 500 is disclosed. The method 500 will be described in relation to one or more of the figures previously described, although the method 500 is not limited to any particular embodiment.

The method 500 includes receiving, at an edge device, a modulated light signal transmitted by a user device, the modulated light signal being received using Light Fidelity (Li-Fi) protocol, the modulated light signal being generated from a built flash of the user device and including a One Time Password (OTP) including randomly generated content that is used during a Multi-Factor Authentication (MFA) process between the user device and an edge device (510). For example, as previously described the edge device receives the modulated light signal 250 using LiFi protocol. The modulated light signal 250 includes the OTP 234 or external OTP 236 and is generated from the flash 220.

The method 500 includes decoding the received modulated light signal to extract the OTP from the modulated light signal (520). For example, as previously described LiFi receiver module 270 decodes the modulated light signal 250 to extract the OTP 234 or external OTP 236.

The method 500 includes validating that the extracted OTP matches an expected OTP that is present at the edge device (530). For example, as previously described the OTP module 280 validates that the extracted OTP 234 or external OTP 236 matches the expected OTP 284 or expected external OTP 286 respectively.

The method 500 includes granting access to the edge device upon a successful completion of the MFA process (540). For example, as previously described the edge device grants access to the user device 210 upon successful completion of the MFA process.

Further Example Embodiments

Following are some further example embodiments of the invention. These are presented only by way of example and are not intended to limit the scope of the invention in any way.

Embodiment 1. A method, comprising: accessing, at a user device, a One Time Password (OTP) including randomly generated content that is used during a Multi-Factor Authentication (MFA) process between the user device and an edge device; mapping, at the user device, the randomly generated content of the OTP onto light that is generated by a built in flash of the user device to generate a modulated light signal; transmitting, from the user device, the modulated light signal to the edge device using Light Fidelity (Li-Fi) protocol; and accessing the edge device upon a successful completion of the MFA process.

Embodiment 2. The method as recited in embodiment 1, wherein a successful completion of the MFA process includes the edge device extracting the OTP from the modulated light signal and validating that the randomly generated content of the OTP matches an expected OTP.

Embodiment 3. The method as recited in embodiments 1-2, wherein the user device is a cell phone.

Embodiment 4. The method as recited in any of embodiments 1-3, wherein accessing the OTP comprises generating the OTP using a one or more algorithms that are executed by the user device.

Embodiment 5. The method as recited in any of embodiments 1-4, wherein accessing the OTP comprises receiving the OTP from an external OTP provider.

Embodiment 6. The method as recited in any of embodiments 1-5, wherein mapping, at the user device, the randomly generated content of the OTP onto light that is generated by a built in flash comprises mapping the randomly generated content into distinct light patterns or light intensities.

Embodiment 7. The method as recited embodiment 6, wherein the user device maintains a line-of-sight with the edge device during transmission of the modulated light signal.

Embodiment 8. The method as recited in any of embodiments 1-7, wherein the user device is placed in close proximity to the edge device during transmission of the modulated light signal.

Embodiment 9. A method, comprising: receiving, at an edge device, a modulated light signal transmitted by a user device, the modulated light signal being received using Light Fidelity (Li-Fi) protocol, the modulated light signal being generated from a built flash of the user device and including a One Time Password (OTP) including randomly generated content that is used during a Multi-Factor Authentication (MFA) process between the user device and an edge device; decoding the received modulated light signal to extract the OTP from the modulated light signal; validating that the extracted OTP matches an expected OTP that is present at the edge device; and granting access to the edge device upon a successful completion of the MFA process.

Embodiment 10. The method as recited in embodiment 9, wherein the edge device is located in a remote location with no access to a network.

Embodiment 11. The method as recited in embodiments 9-10, wherein the edge device is located in a secure location.

Embodiment 12. The method as recited in any of embodiments 9-11, wherein the expected OTP is generated by the edge device executing one or more algorithms that are the same as one or more algorithms executed by the user device to generate the OTP.

Embodiment 13. The method as recited in any of embodiments 9-12, wherein the expected OTP is received from an external OTP provider who also provided the OTP to the user device.

Embodiment 14. The method as recited in any of embodiments 9-13, wherein the edge device maintains a line-of-sight with the user device as the modulated light signal is received from the user device.

Embodiment 15. The method as recited in any of embodiments 9-14, wherein the user device is placed in close proximity to the edge device as the modulated light signal is received from the user device.

Embodiment 16. A system, comprising hardware and/or software, operable to perform any of the operations, methods, or processes, or any portion of any of these, disclosed herein.

Embodiment 17. A non-transitory storage medium having stored therein instructions that are executable by one or more hardware processors to perform operations comprising the operations of any one or more of embodiments 1-15.

Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to conduct executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
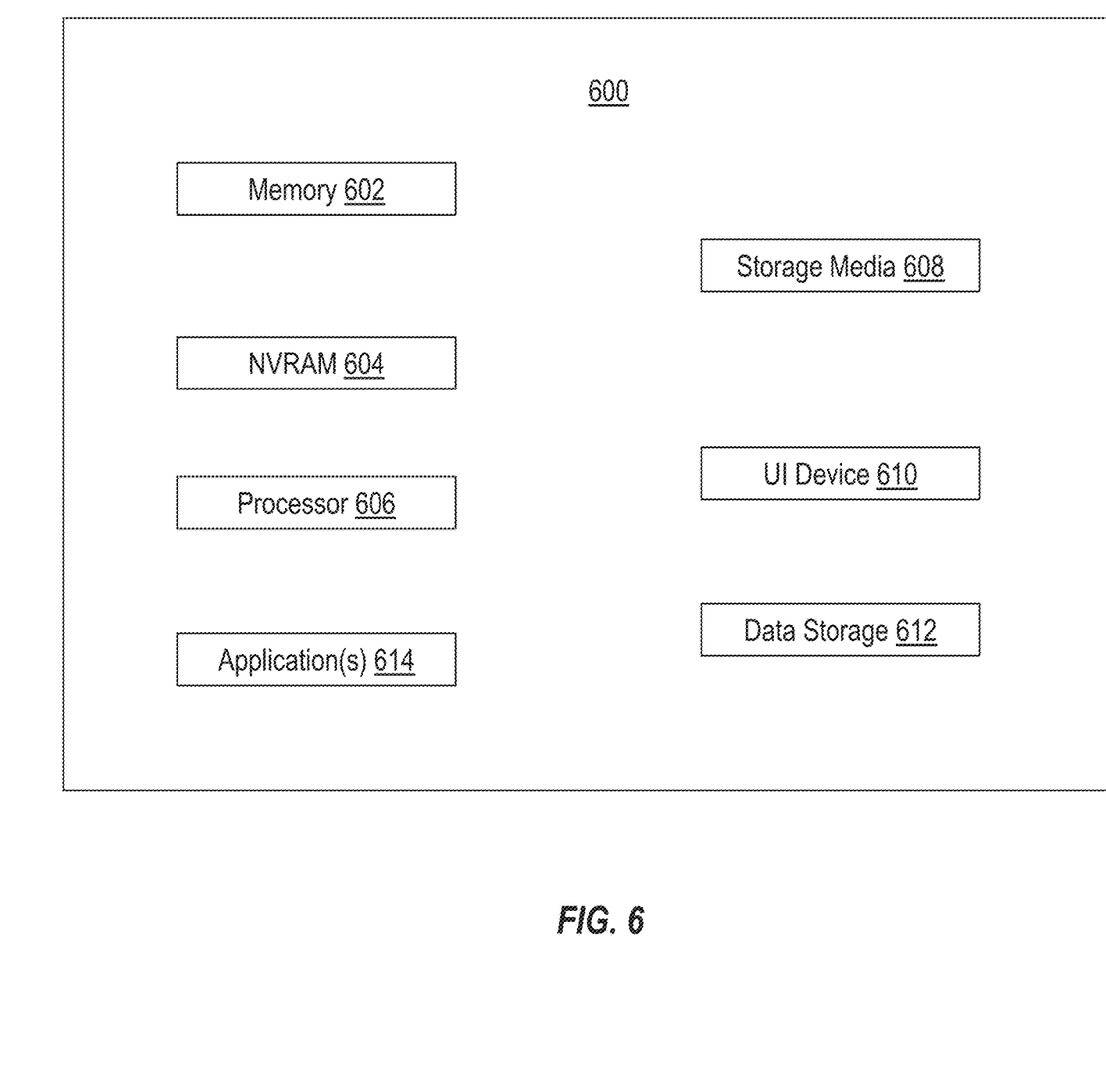
FIG. 6 discloses an example computing entity configured to perform any of the disclosed methods, processes, and operations.

With reference briefly now to FIG. 6, any one or more of the entities disclosed, or implied, by FIGS. 1A-2, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   accessing, at a user device, a One Time Password (OTP) including randomly generated content that is used during a Multi-Factor Authentication (MFA) process between the user device and an edge device;
   mapping, at the user device, the randomly generated content of the OTP onto light that is generated by a built in flash of the user device to generate a modulated light signal;
   transmitting, from the user device, the modulated light signal to the edge device using Light Fidelity (Li-Fi) protocol; and
   accessing the edge device upon a successful completion of the MFA process, and successful completion of the MFA process comprises the edge device extracting the OTP from the modulated light signal and validating that the randomly generated content of the OTP matches an expected OTP.

2. The method of claim 1, wherein the user device is a cell phone.

3. The method of claim 1, wherein accessing the OTP comprises generating the OTP using a one or more algorithms that are executed by the user device.

4. The method of claim 1, wherein accessing the OTP comprises receiving the OTP from an external OTP provider.

5. The method of claim 1, wherein mapping, at the user device, the randomly generated content of the OTP onto light that is generated by a built in flash comprises mapping the randomly generated content into distinct light patterns or light intensities.

6. The method of claim 1, wherein the user device maintains a line-of-sight with the edge device during transmission of the modulated light signal.

7. The method of claim 6, wherein the user device is placed in close proximity to the edge device during transmission of the modulated light signal.

8. A method, comprising:
   receiving, at an edge device, a modulated light signal transmitted by a user device, the modulated light signal being received using Light Fidelity (Li-Fi) protocol, the modulated light signal being generated from light generated by a built flash of the user device and including a One Time Password (OTP) including randomly generated content that is used during a Multi-Factor Authentication (MFA) process between the user device and the edge device;
   decoding the received modulated light signal to extract the OTP from the modulated light signal;
   validating that the extracted OTP matches an expected OTP that is present at the edge device; and
   granting access to the edge device upon a successful completion of the MFA process, and successful completion of the MFA process comprises the edge device extracting the OTP from the modulated light signal and validating that the randomly generated content of the OTP matches an expected OTP.

9. The method of claim 8, wherein the edge device is located in a remote location with no access to a network.

10. The method of claim 8, wherein the edge device is located in a secure location.

11. The method of claim 8, wherein the expected OTP is generated by the edge device executing one or more algorithms that are the same as the one or more algorithms executed by the user device to generate the OTP.

12. The method of claim 8, wherein the expected OTP is received from an external OTP provider who also provided the OTP to the user device.

13. The method of claim 8, wherein the edge device maintains a line-of-sight with the user device as the modulated light signal is received from the user device.

14. The method of claim 13, wherein the user device is placed in close proximity to the edge device as the modulated light signal is received from the user device.

15. A system comprising:
   a user device comprising:
   a processor; and
   computer readable medium having stored thereon executable code that, when executed by the processor, cause the user device to perform the following:
   access a One Time Password (OTP) including randomly generated content that is used during a Multi-Factor Authentication (MFA) process between the user device and an edge device;
   map the randomly generated content of the OTP onto light that is generated by a built in flash of the user device to generate a modulated light signal; and transmit the modulated light signal to the edge device using Light Fidelity (Li-Fi) protocol; and the edge device comprising:

a processor; and computer readable medium having stored thereon executable code that, when executed by the processor, cause the edge device to perform the following:

receive the modulated light signal transmitted by the user device;

decode the received modulated light signal to extract the OTP from the modulated light signal;

validate that the extracted OTP matches an expected OTP that is present at the edge device; and grant access to the edge device upon a successful completion of the MFA process, and successful completion of the MFA process comprises the edge device extracting the OTP from the modulated light signal and validating that the randomly generated content of the OTP matches an expected OTP.

16. The system of claim 15, wherein the user device is a cell phone.

17. The system of claim 15, wherein accessing the OTP comprises generating the OTP using a one or more algorithms that are executed by the user device.

18. The system of claim 16, wherein accessing the OTP comprises receiving the OTP from an external OTP provider.

19. The system of claim 16, wherein mapping the randomly generated content of the OTP onto light that is generated by a built in flash comprises mapping the randomly generated content into distinct light patterns or light intensities.

* * * * *